US012500664B2

(12) United States Patent
Leng et al.

(10) Patent No.: US 12,500,664 B2
(45) Date of Patent: Dec. 16, 2025

(54) TRIGGERING TIMING SYNCHRONIZATION IN NON-TERRESTRIAL NETWORKS

(71) Applicant: Samsung Electronics Co., Ltd., Suwon-si (KR)

(72) Inventors: Shiyang Leng, Allen, TX (US); Kyeongin Jeong, Allen, TX (US); Anil Agiwal, McKinney, TX (US); Hongbo Si, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 18/353,808

(22) Filed: Jul. 17, 2023

(65) Prior Publication Data
US 2024/0048227 A1 Feb. 8, 2024

Related U.S. Application Data

(60) Provisional application No. 63/464,122, filed on May 4, 2023, provisional application No. 63/454,543, filed
(Continued)

(51) Int. Cl.
*H04B 7/185* (2006.01)
*H04W 56/00* (2009.01)
(Continued)

(52) U.S. Cl.
CPC .... *H04B 7/18513* (2013.01); *H04W 56/0045* (2013.01); *H04W 72/23* (2023.01); *H04W 74/0833* (2013.01)

(58) Field of Classification Search
CPC .............. H04B 7/18513; H04W 72/23; H04W 56/0045; H04W 74/0833
See application file for complete search history.

(56) References Cited

U.S. PATENT DOCUMENTS

2015/0181544 A1* 6/2015 Liu ................... H04W 56/0045
370/336
2020/0029326 A1 1/2020 Wang et al.
(Continued)

FOREIGN PATENT DOCUMENTS

CN 114503783 A 5/2022
WO 2020092561 A1 5/2020
(Continued)

OTHER PUBLICATIONS

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.
(Continued)

*Primary Examiner* — Jael M Ulysse

(57) ABSTRACT

Methods and apparatuses for a timing advance report an NTN is provided. The method of UE comprises: receiving, from a BS, first information including satellite assistance information for a target satellite; receiving, from the BS, second information including timing information, wherein the timing information includes at least one of a start time and a time duration for a synchronization operation; determining whether a RACH-less synchronization operation is configured; and initiating, based on the satellite assistance information and the timing information, the synchronization operation by performing a RA procedure upon a determination that the RACH-less synchronization operation is not configured.

20 Claims, 10 Drawing Sheets

Related U.S. Application Data on Mar. 24, 2023, provisional application No. 63/421,747, filed on Nov. 2, 2022, provisional application No. 63/395,622, filed on Aug. 5, 2022.

(51) Int. Cl.
*H04W 72/23* (2023.01)
*H04W 74/0833* (2024.01)

(56) References Cited

U.S. PATENT DOCUMENTS

| | | | | |
|---|---|---|---|---|
| 2020/0404713 | A1* | 12/2020 | Sakhnini | H04W 74/0833 |
| 2021/0175964 | A1* | 6/2021 | Kusashima | H04W 56/0005 |
| 2021/0289465 | A1* | 9/2021 | Lee | H04W 74/02 |
| 2022/0086786 | A1* | 3/2022 | Narasimha | H04B 7/18506 |
| 2022/0110037 | A1* | 4/2022 | Bergqvist | H04W 72/23 |
| 2022/0132463 | A1* | 4/2022 | Cha | H04B 17/27 |
| 2022/0224407 | A1* | 7/2022 | Shrestha | H04W 74/0833 |
| 2022/0255619 | A1* | 8/2022 | Yu | H04B 7/1853 |
| 2023/0015847 | A1* | 1/2023 | Li | H04W 72/23 |
| 2023/0049998 | A1* | 2/2023 | Li | H04W 72/1268 |
| 2023/0099762 | A1* | 3/2023 | Khoshkholgh Dashtaki | H04W 72/23 370/350 |
| 2023/0164732 | A1* | 5/2023 | Lee | H04L 5/0053 455/456.1 |
| 2023/0164847 | A1* | 5/2023 | Kim | H04W 74/0866 370/329 |
| 2023/0300770 | A1* | 9/2023 | Liu | H04B 7/1853 370/350 |
| 2023/0403586 | A1* | 12/2023 | Shrestha | H04W 52/0254 |
| 2023/0413131 | A1* | 12/2023 | Shrestha | H04W 72/23 |
| 2024/0064851 | A1* | 2/2024 | Li | H04B 7/18519 |
| 2024/0187903 | A1* | 6/2024 | Hasegawa | H04B 17/328 |
| 2024/0323900 | A1* | 9/2024 | Niu | H04W 56/0045 |
| 2024/0389159 | A1* | 11/2024 | Lee | H04B 7/0695 |
| 2025/0168788 | A1* | 5/2025 | Zhu | H04B 7/1851 |
| 2025/0240825 | A1* | 7/2025 | Manolakis | H04L 5/0005 |

FOREIGN PATENT DOCUMENTS

| | | |
|---|---|---|
| WO | 2021230815 A1 | 11/2021 |
| WO | 2022031098 A1 | 2/2022 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"5G; NR; NR and NG-RAN Overall description; Stage-2 (3GPP TS 38.300 version 17.2.0 Release 17)", ETSI TS 138 300 V17.2.0, Oct. 2022, 212 pages.

"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.

"5G; NR; User Equipment (UE) radio access capabilities (3GPP TS 38.306 version 17.2.0 Release 17)", ETSI TS 138 306 V17.2.0, Oct. 2022, 245 pages.

"3rd Generation Partnership Project; Technical Specification Group Radio Access Network; NR; Medium Access Control (MAC) protocol specification (Release 17)", 3GPP TS 38.321 V17.2.0, Sep. 2022, 246 pages.

International Search Report and Written Opinion issued Nov. 14, 2023 regarding International Application No. PCT/KR2023/010906, 8 pages.

Ericsson, "Control plane aspects of IoT NTN", 3GPP TSG-RAN WG2 Meeting #116bis-e, R2-2201600, Jan. 2022, 17 pages.

Extended European Search Report issued Jun. 13, 2025 regarding Application No. 23850341.1, 9 pages.

\* cited by examiner

TRIGGERING TIMING SYNCHRONIZATION IN NON-TERRESTRIAL NETWORKS

CROSS-REFERENCE TO RELATED APPLICATIONS AND CLAIM OF PRIORITY

The present application claims priority to:
U.S. Provisional Patent Application No. 63/395,622, filed on Aug. 5, 2022;
U.S. Provisional Patent Application No. 63/421,747, filed on Nov. 2, 2022;
U.S. Provisional Patent Application No. 63/454,543, filed on Mar. 24, 2023; and
U.S. Provisional Patent Application No. 63/464,122, filed on May 4, 2023. The content of the above-identified patent documents is incorporated herein by reference.

TECHNICAL FIELD

The present disclosure relates generally to wireless communication systems and, more specifically, the present disclosure relates to triggering timing synchronization in a non-terrestrial network (NTN).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a TA report in an NTN.

In one embodiment, a user equipment (UE) is provided. The UE comprises a transceiver configured to: receive, from a base station (BS), first information including satellite assistance information for a target satellite, and receive, from the BS, second information including timing information, wherein the timing information includes at least one of a start time and a time duration for a synchronization operation. The UE further comprises a processor operably coupled to the transceiver, the processor configured to: determine whether a random access channel-less (RACH-less) synchronization operation is configured, and initiate, based on the satellite assistance information and the timing information, the synchronization operation by performing a random access (RA) procedure upon a determination that the RACH-less synchronization operation is not configured.

In one embodiment, a BS is provided. The BS comprises a processor and a transceiver operably coupled to the processor, the transceiver configured to: transmit, to a UE, first information including satellite assistance information for a target satellite, and transmit, to the UE, second information including timing information, wherein the timing information includes at least one of a start time and a time duration for a synchronization operation, transmit, to the UE, a third information indicating whether RACH-less synchronization operation is configured, wherein: when the indication indicates that the RACH-less synchronization operation is not configured, the synchronization operation is initiated based on the satellite assistance information and the timing information.

In another embodiment, a method of a UE is provided. The UE comprises: receiving, from a BS, first information including satellite assistance information for a target satellite; receiving, from the BS, second information including timing information, wherein the timing information includes at least one of a start time and a time duration for a synchronization operation; determining whether a RACH-less synchronization operation is configured; and initiating, based on the satellite assistance information and the timing information, the synchronization operation by performing a RA procedure upon a determination that the RACH-less synchronization operation is not configured.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TR 38.811 v15.2.0, "Study on NR to support non-terrestrial networks"; 3GPP TR 38.821 v16.0.0, "Solutions for NR to support non-terrestrial networks (NTN)"; 3GPP TS 38.300 v17.2.0, "5G; NR; NR and NG-RAN Overall description; Stage-2"; 3GPP TS 38.331 v17.2.0, "5G; NR; Radio Resource Control (RRC); Protocol specification"; 3GPP TS 38.306 v17.2.0, "5G; NR; User Equipment (UE) radio access capabilities"; and 3GPP TS 38.321 v17.2.0, 5G; NR; Medium Access Control (MAC) protocol specification".

Figure 1:
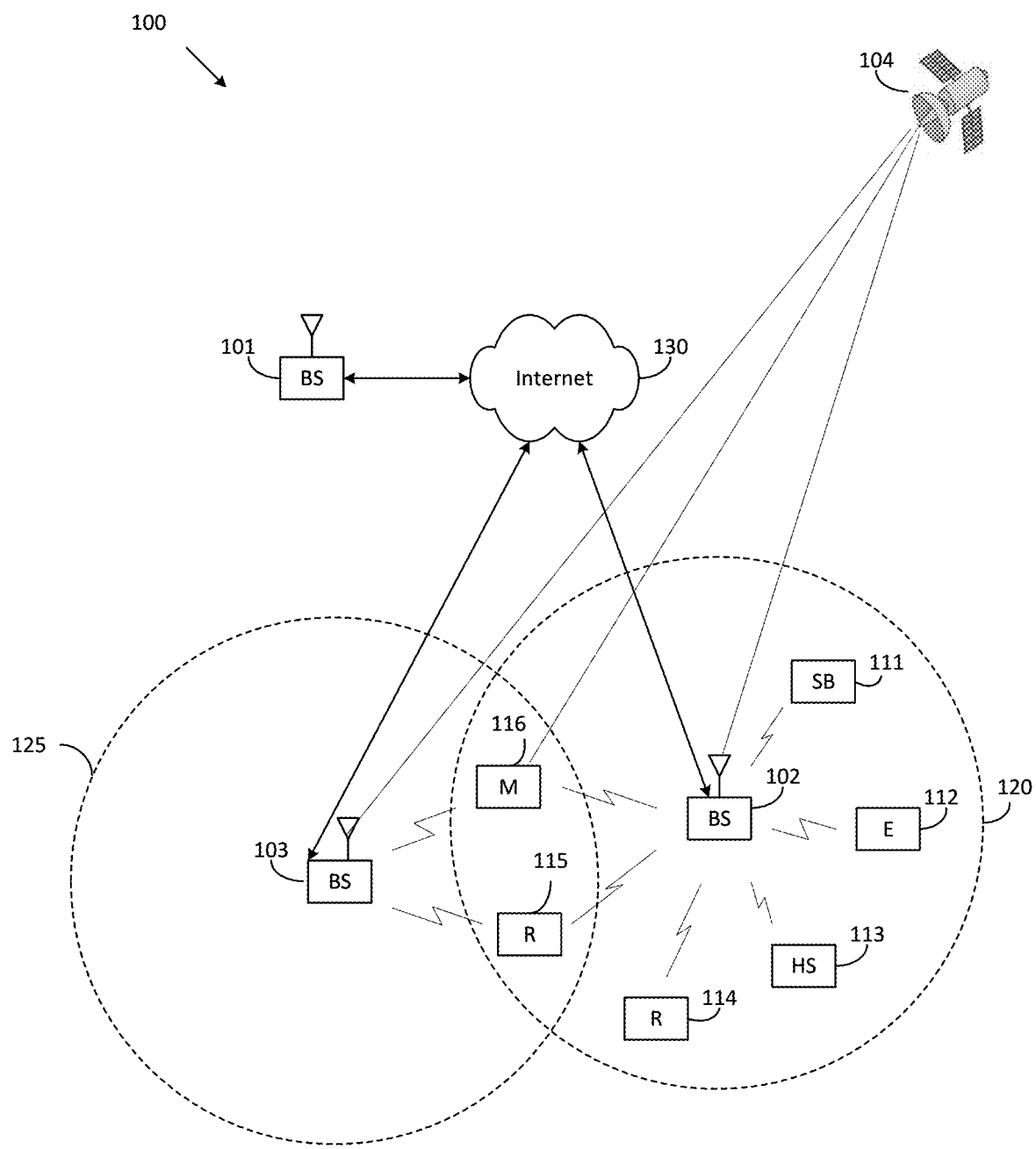
FIG. 1 illustrates an example of wireless network according to embodiments of the present disclosure.
Figure 2:
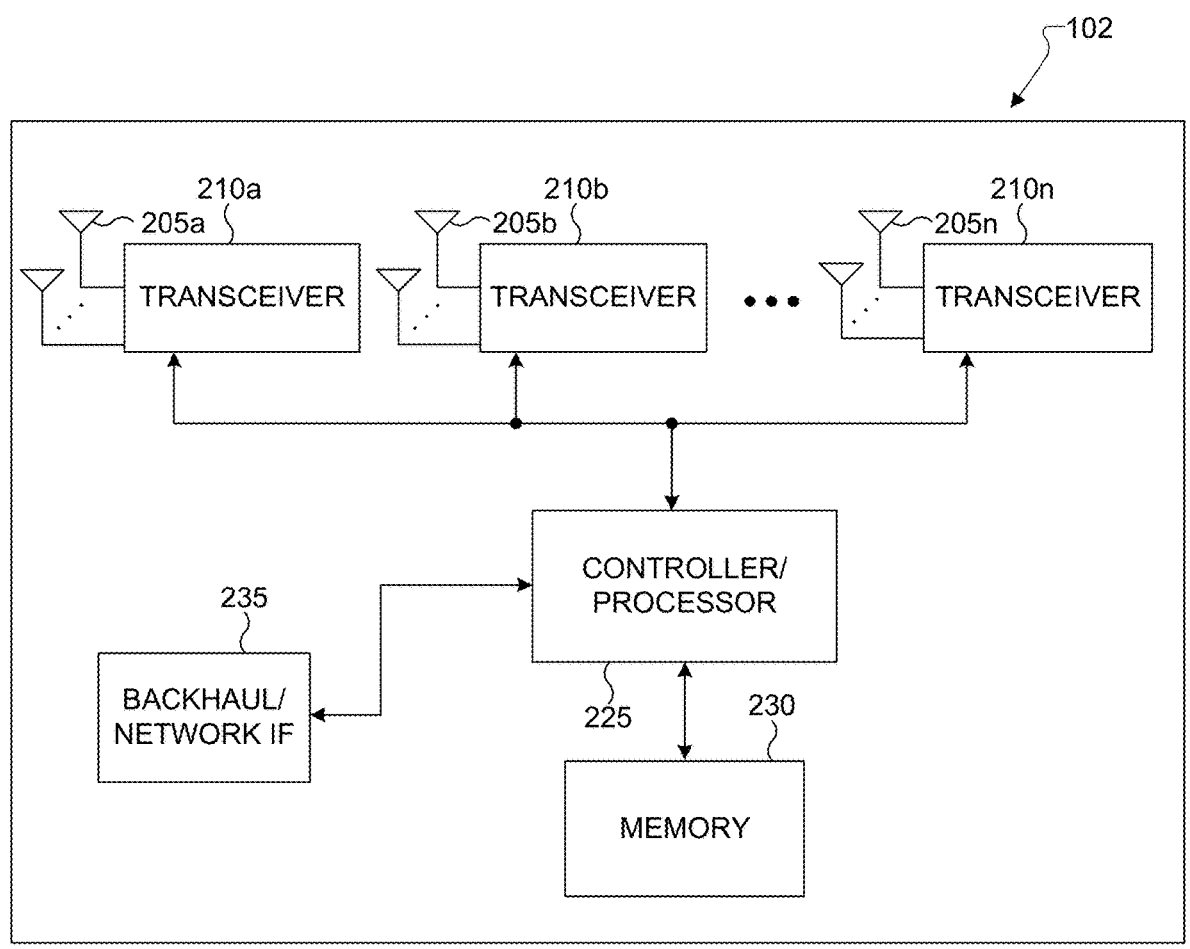
FIG. 2 illustrates an example of gNB according to embodiments of the present disclosure.
Figure 3:
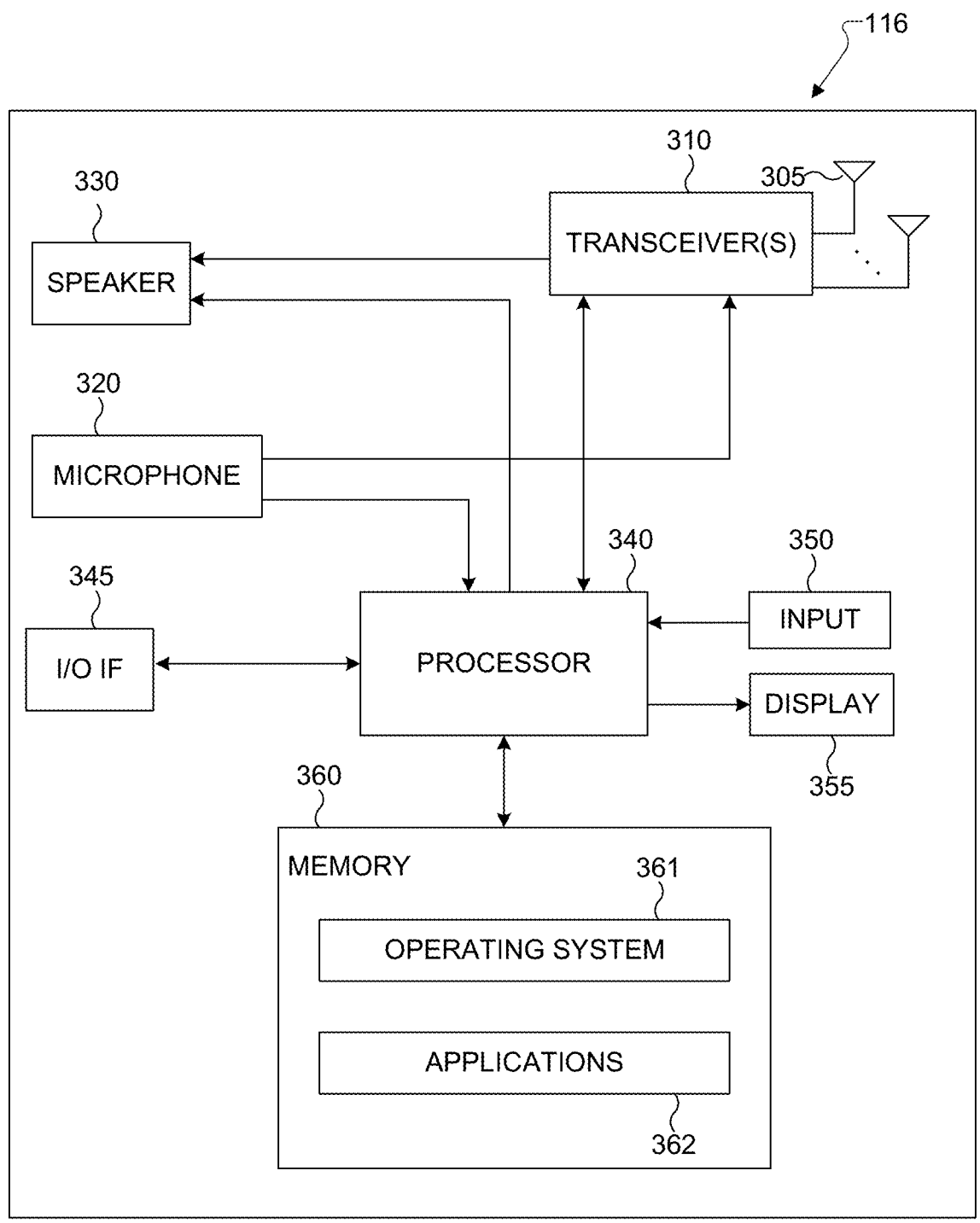
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As discussed in greater detail below, the wireless network 100 may have communications facilitated via one or more communication satellite(s) 104 that may be in obit over the earth. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

An NTN refers to a network, or segment of networks using RF resources on board a communication satellite (or unmanned aircraft system platform) (e.g., communication satellite(s) 104). Considering the capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications, etc.

As described in more detail below, one or more of the UEs 111-116 include circuitry, programing, or a combination thereof, for utilizing triggers for timing synchronization in in a NTN. In certain embodiments, and one or more of the gNBs 101-103 includes circuitry, programing, or a combination thereof, for triggering timing synchronization in a NTN.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for triggering timing synchronization in a NTN.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for utilizing triggers for timing synchronization in a NTN. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
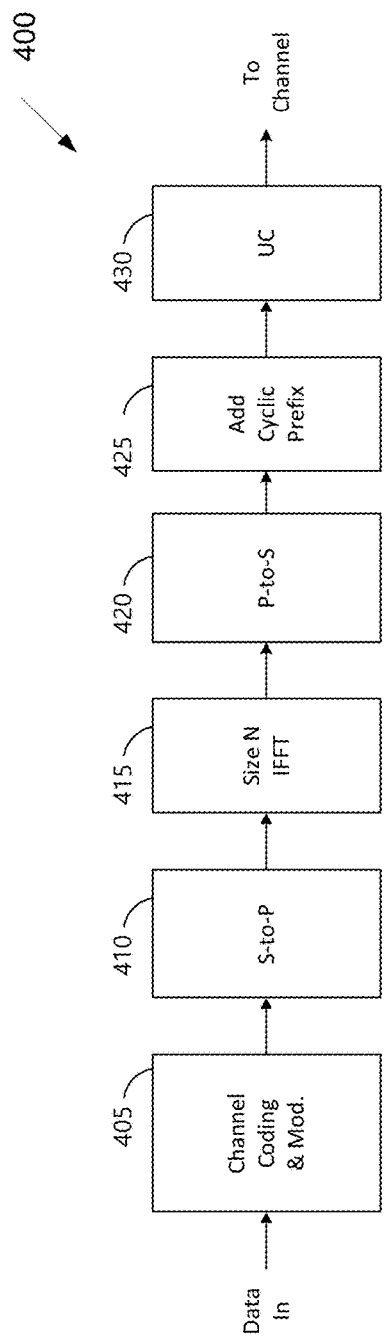
FIGS. 4 and 5 illustrate example of wireless transmit and receive paths according to this disclosure.
Figure 5:
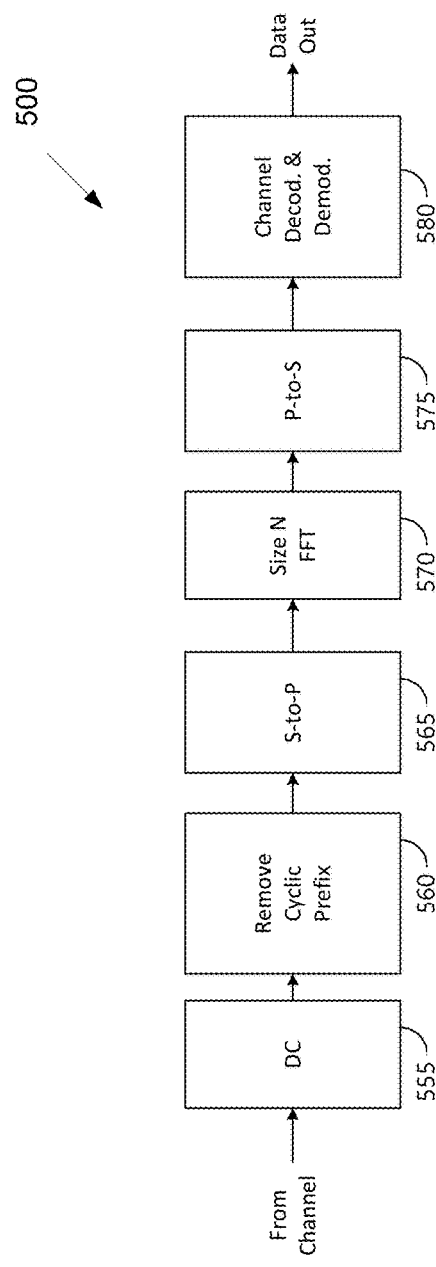

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support triggering for timing synchronization in a NTN as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
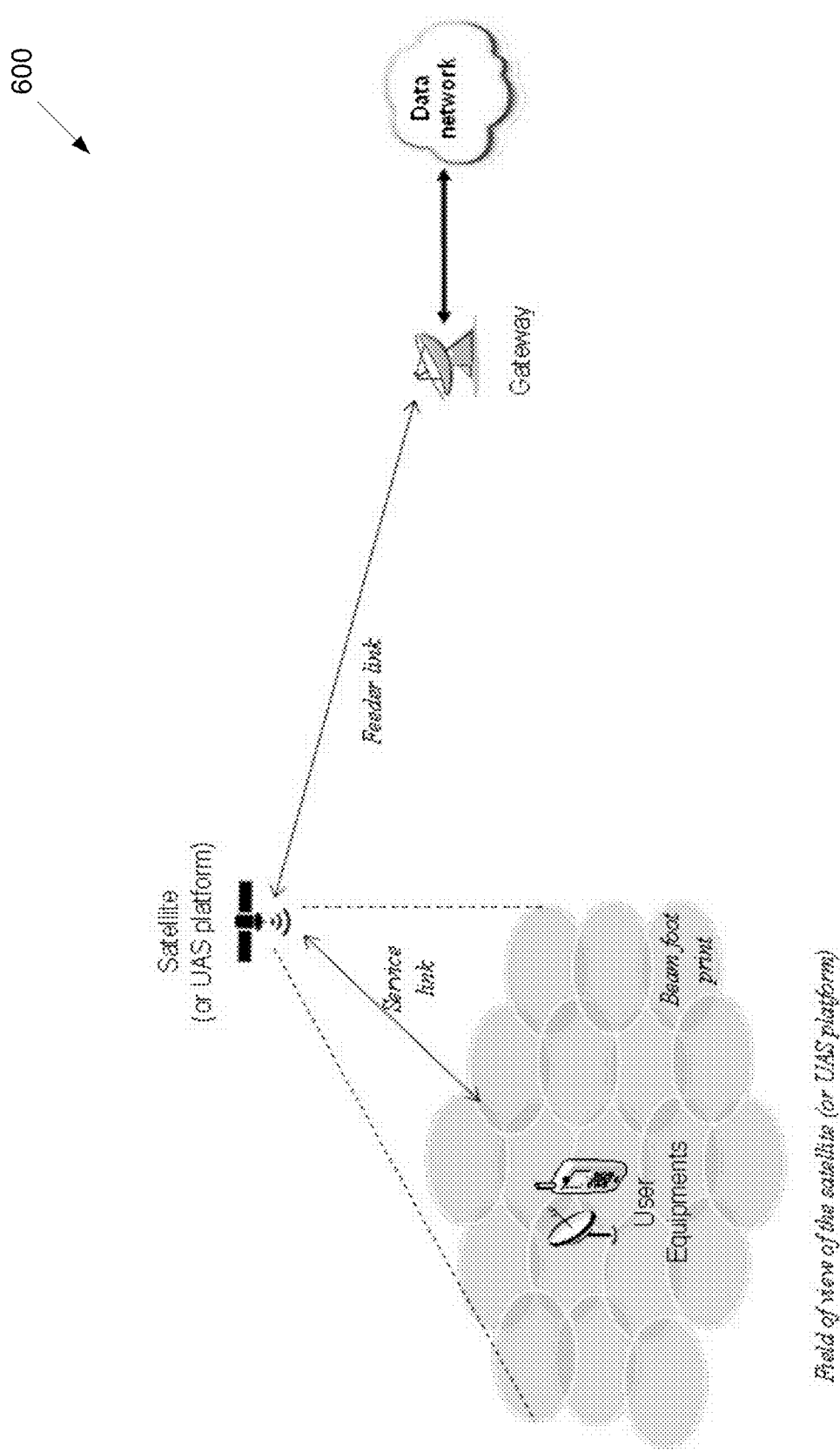
FIG. 6 illustrates an example of NTN communication according to embodiments of the present disclosure.

FIG. 6 illustrates an example of NTN communication 600 according to embodiments of the present disclosure. An embodiment of the NTN communication 600 shown in FIG. 6 is for illustration only.

In 3GPP wireless standards, new radio access technology (NR) is discussed as 5G wireless communication technology. One of NR feature under the discussion is an NTN. An NTN refers to a network, or segment of networks using RF resources on board a satellite (or unmanned aircraft system (UAS) platform) as shown FIG. 6. An NTN typically features the following example elements.

In one example, one or several sat-gateways may connect the NTN to a public data network.

In one example, a geostationary earth orbit (GEO), circular orbit at 35,786 km above the Earth's equator and following the direction of the Earth's rotation) satellite is fed by one or several sat-gateways which are deployed across the satellite targeted coverage (e.g., regional or even continental coverage). It may be assumed that UEs in a cell are served by only one sat-gateway.

In one example, a non-GEO satellite is served successively by one or several sat-gateways at a time. The system ensures service and feeder link continuity between the successive serving sat-gateways with sufficient time duration to proceed with mobility anchoring and hand-over. A LEO (Low Earth Orbit: orbit around the Earth with an altitude between 300 km, and 1500 km) satellite can be one example.

In one example, a feeder link or radio link between a sat-gateway and the satellite (or UAS platform) is provided.

In one example, a service link or radio link between the user equipment and the satellite (or UAS platform) is provided.

In one example, a satellite (or UAS platform) may implement either a transparent or a regenerative (with on board processing) payload. The satellite (or UAS platform) generate beams typically generate several beams over a given service area bounded by a field of view. The footprints of the beams are typically of elliptic shape. The field of view of a satellite (or UAS platforms) depends on the on-board antenna diagram and min elevation angle.

In one example, a transparent payload is provided: radio frequency filtering, frequency conversion and amplification. Hence, the waveform signal repeated by the payload is un-changed.

In one example, a regenerative payload is provided: radio frequency filtering, frequency conversion and amplification as well as demodulation/decoding, switch and/or routing, coding/modulation. This is effectively equivalent to having all or part of base station functions (e.g., gNB) on board the satellite (or UAS platform).

In one example, inter-satellite links (ISL) is optionally provided in case of a constellation of satellites. This may require regenerative payloads on board the satellites. ISL may operate in RF frequency or optical bands.

In one example, a UE is served by the satellite (or UAS platform) within the targeted service area.

In 3GPP Release-17 (Rel-17), the basic features of NTN are introduced and further enhanced features are to be considered in Rel-18. One of features is to support service continuity enhancements. A service may be interrupted if a radio link between the UE and satellite is failed/broken. This embodiment provides a fast RLF detection in NTN, so the UE can re-establish RRC connection more quickly upon radio link failure. With this embodiment, better service continuity can be achieved.

Figure 7:
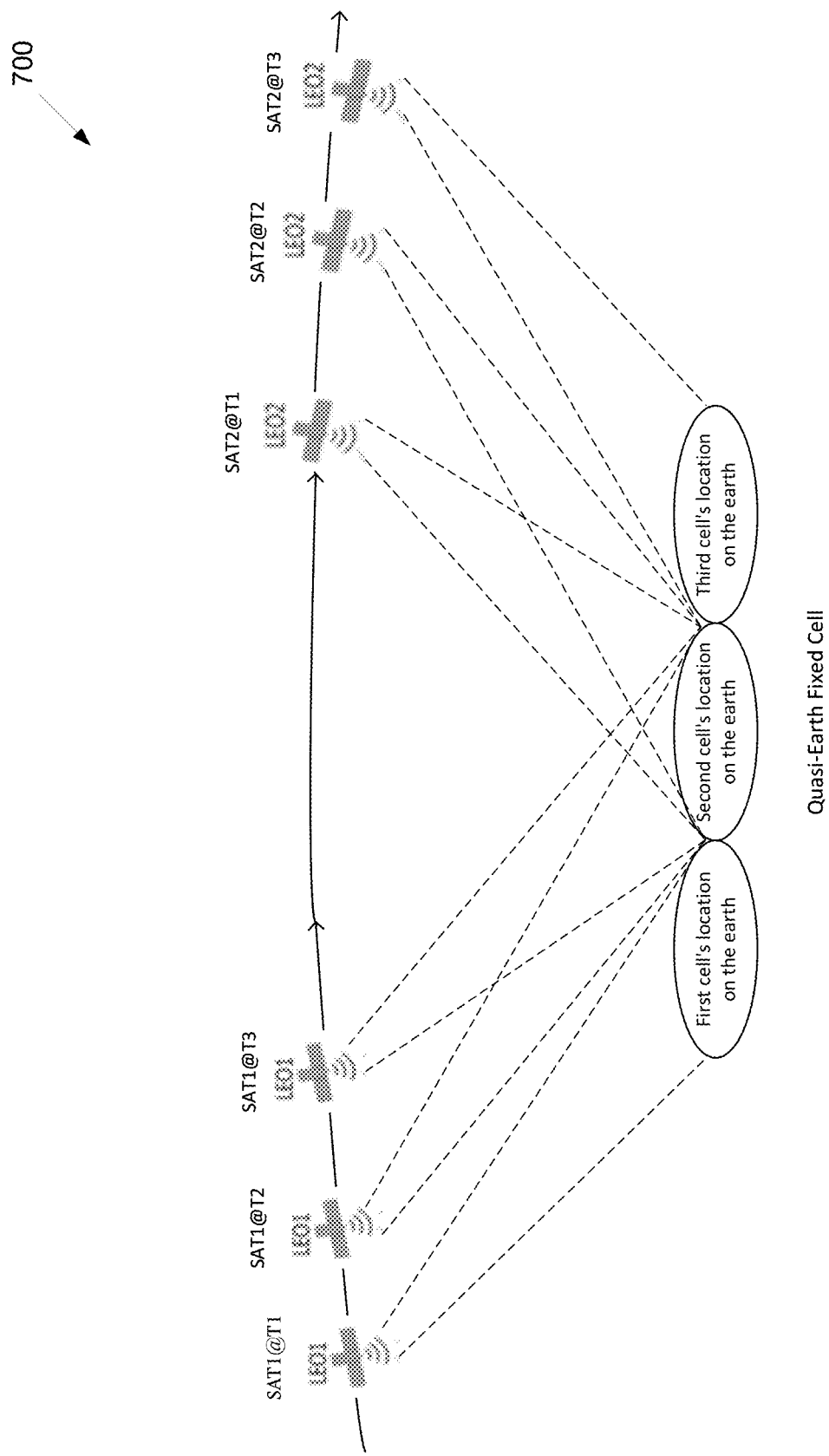
FIG. 7 illustrates an example of NTN quasi-earth fixed cell according to embodiments of the present disclosure.

FIG. 7 illustrates an example of NTN quasi-earth fixed cell 700 according to embodiments of the present disclosure. An embodiment of the NTN quasi-earth fixed cell 700 1000 shown in FIG. 7 is for illustration only.

FIG. 7 describes one example of how NTN provides cells that are fixed with respect to a certain location on the earth during a certain time duration. This can be achieved with NTN platforms generating steerable beams which footprint is fixed on the ground. It may be assumed that satellite 1

(SAT 1) (here it is also called as low-Earth orbit 1 (LEO 1) and satellite 2 (SAT 2) (here it is also called as LEO 2) are moving from the west to east direction. T1, T2, and T3 indicates certain consecutive time duration (e.g., T1 is between absolute time t1 to t2, T2 is between absolute time t2 to t3, and T3 is between absolute time t3 to t4).

During T1 duration, SAT 1 provides NR service to the first cell's location on the earth and SAT 2 provides NR service to the second cell's location on the earth. During T2 duration, both SAT 1 and SAT 2 provides NR service to the second cell's location on the earth. It is noted that a physical cell identifier (PCI) of the second cell's location on the earth by SAT 1 and SAT 2 can be different, which means the second cell's location on the earth is covered by two PCIs. In the case, each PCI and the associated NR service are provided by each satellite (e.g., SAT 1 and SAT 2).

It is also noted that the frequency location of the synchronization signal block (SSB) that includes cell's PCI information can be different between two cells in order to avoid strong interference in the case two cells are entirely overlapped. For instance, during T2 duration the second cell's location on the earth is served by PCI #N carried by SSB located in the carrier #1 by SAT 1 while the second cell's location is served by PCI #M carried by SSB located in the carrier #2 by SAT2. However, the PCI #M by SAT 2 may be disappeared later since SAT 2 may serve the third cell's location on the earth during the following T3 duration. This type of NTN cell (or service link) is called as quasi-earth fixed cell.

It is noted that following three types of NTN cell (or service link) can be supported: (1) Earth-fixed: provisioned by beam(s) continuously covering the same geographical areas all the time (e.g., the case of GSO satellites); (2) quasi-Earth-fixed: provisioned by beam(s) covering one geographic area for a limited period and a different geographic area during another period (e.g., the case of NGSO satellites generating steerable beams); and (3) Earth-moving: provisioned by beam(s) whose coverage area slides over the Earth surface (e.g., the case of NGSO satellites generating fixed or non-steerable beams).

With NGSO satellites, the gNB can provide either quasi-Earth-fixed cell coverage or Earth-moving cell coverage, while gNB operating with GSO satellite can provide Earth fixed cell coverage. Due to different properties of GSO and NGSO, different types of cells can be supported in NTN, which are the earth-fixed cell, the quasi-earth-fixed cell, and the earth-moving cell. For a certain type of NTN payload/cell, specific features or functionalities are desired to be supported by the UE for radio access.

For NTN in Release 17 specification, a TA report is introduced for open-loop UL synchronization and assist NW to schedule UE appropriately. The UE capable of TA report can be configured to report its estimated TA based on UE location and satellite information in SIB in a random access procedure for an RRC setup, an RRC reestablishment, an RRC resume, and a handover. In an RRC_CONNECTED state, the UE reports TA by MAC CE in an event-trigger manner, i.e., a TA report is triggered when the variation between the current TA and the last reported TA is equal to or larger than a configured threshold.

In Release-17 specifications for an NTN, the UE in an RRC_CONNECTED state can transmit a TA report MAC CE whenever the TA report event is triggered. However, the UE does not know whether the transmission of TA report is successful or not when using HARQ processes with feedback disabled, and the interval between the two successful TA reports can be long.

Furthermore, when UE cannot reacquire an SIB to obtain valid satellite information including common TA and ephemeris and the validity timer (i.e., T430) expires, the UE may stop any uplink transmission and reacquire SIB. In these cases, the gNB may not be able to receive fresh TA report for a long duration and the TA information can be outdated at the gNB, which can lead to UE scheduling failure. Thus, event-triggered TA report for an RRC_CONNECTED state may not work well. New TA report mechanisms are desired.

Figure 8:
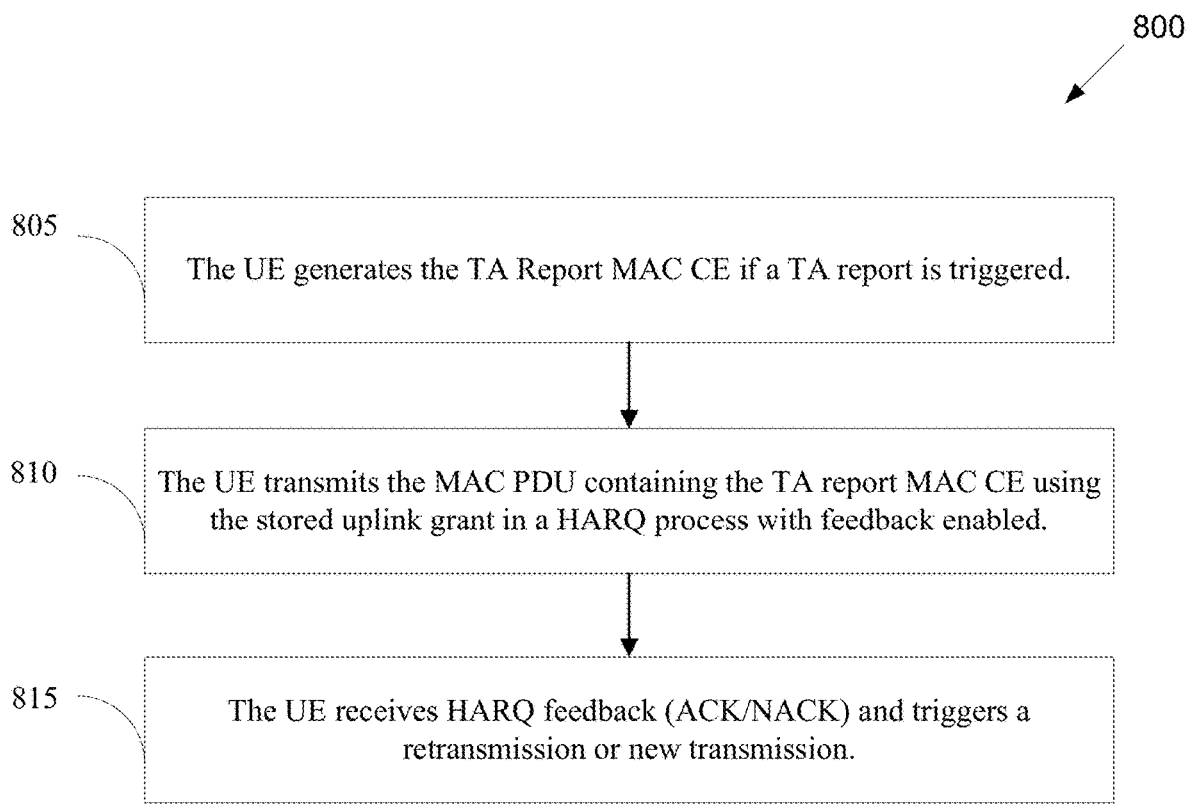
FIG. 8 illustrates a flowchart of UE behavior to transmit a TA report MAC CE with HARQ feedback according to embodiments of the present disclosure.

FIG. 8 illustrates a flowchart of UE behavior 800 to transmit a TA report MAC CE with HARQ feedback according to embodiments of the present disclosure. The UE behavior 800 as may be performed by a UE (e.g., 111-116 as illustrated in FIG. 1). An embodiment of the UE behavior 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

To ensure that a gNB can successfully receive fresh TA information in the current event-triggered report, the UE can be restricted to use only HARQ processes with feedback enabled for TA report MAC CE transmission. As shown in FIG. 8, at operation 805, the UE generates the TA Report MAC CE if a TA report is triggered. The TA report can be triggered upon indication from upper layers for an RRC setup, an RRC reestablishment, an RRC resume, a handover, a periodic/aperiodic/semi-persistent TA report; and/or upon indication from a DCI format in a PDCCH, and/or upon configuration or reconfiguration of offsetThresholdTA by upper layers, if the UE has not previously reported TA value to current serving cell; and/or if the variation between current information about TA and the last reported information about TA is equal to or larger than offsetThresholdTA, if configured.

At operation 810, the UE transmits the MAC PDU containing the TA report MAC CE using the stored uplink grant in a HARQ process with feedback enabled. If there is no uplink grant available and/or there is no HARQ process with feedback enabled available, the UE can trigger a scheduling request. At operation 815, the UE receives HARQ feedback (ACK/NACK) and triggers a retransmission or new transmission. If a NACK is received, the UE generates a retransmission for the TA report MAC CE using the indicated uplink grant in DCI or configured uplink grant.

The NW can request the UE to transmit a TA report whenever there is a need, for example when the NW has not received a new TA report for a certain duration, and/or when the NW figures out there is a failure in TA report transmission, and/or when the NW cannot successfully schedule the UE, and/or the NW has downlink data to transmit but the UE is out-of-synchronization. The NW can request TA report based on UE capability of supporting TA report in RACH and/or UE capability of supporting TA report in an RRC_CONNECTED state.

Figure 9:
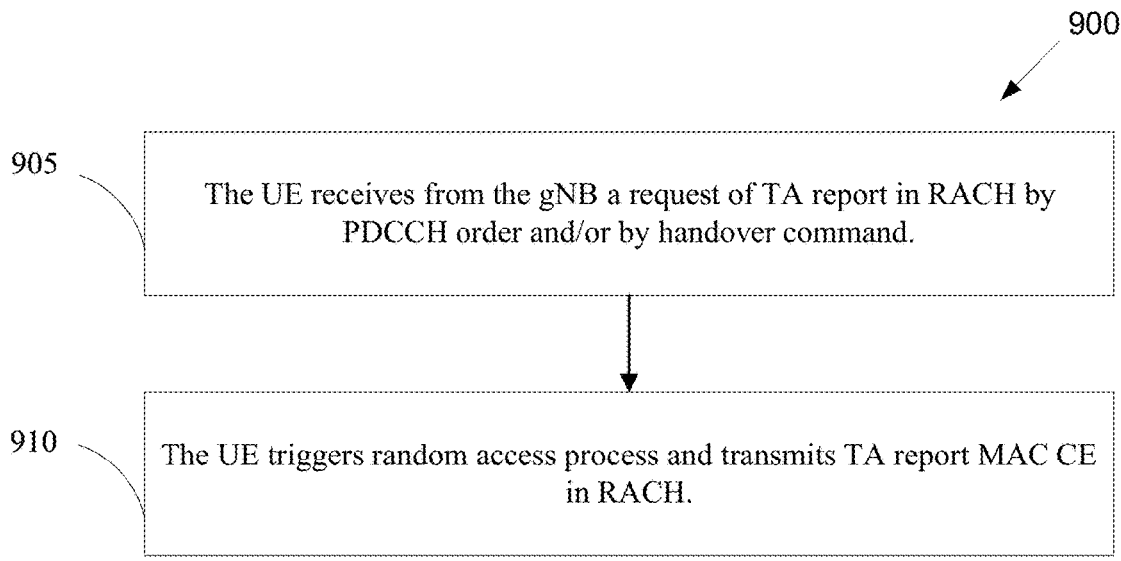
FIG. 9 illustrates a flowchart of UE behavior for an NE-requested TA report in an RACH in an RRC_CONNECTED state according to embodiments of the present disclosure.

FIG. 9 illustrates a flowchart of UE behavior 900 for an NE-requested TA report in an RACH in an RRC_CONNECTED state according to embodiments of the present disclosure. The UE behavior 900 as may be performed by a UE (e.g., 111-116 as illustrated in FIG. 1). An embodiment of the UE behavior 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In one embodiment as shown in FIG. 9, at operation 905, the UE receives from the gNB a request of TA report in RACH by PDCCH order and/or by handover command. In one example, the UE can receive a TA report request indication in DCI in PDCCH order with dedicated RACH preamble. PDCCH order is sent via DCI Format 1_0 with C-RNTI CRC scrambled, containing SSB index, ra-PreambleIndex, and PRACH Mask Index, and a TA report indication using any spare bits or repurposing any bit. In the case of 2-step RACH procedure, PDCCH order contains SSB index, ra-PreambleIndex and msgA-SSB-SharedRO-MaskIndex, and a TA report indication using any spare bits in DCI format.

In another example, the UE can receive a HO command for intra-cell handover so that the UE may perform random access process to the current serving cell. In one more example, the TA report is requested in RACH if the UE is configured with ta-Report enabled in SIB. At operation 910, the UE triggers a random access procedure with the information received. If there is no dedicated RACH preamble the UE may trigger CBRA procedure and send C-RNTI MAC CE in Msg3 for contention resolution. The UE includes TA report MAC CE in MsgA or Msg3 or Msg5.

Figure 10:
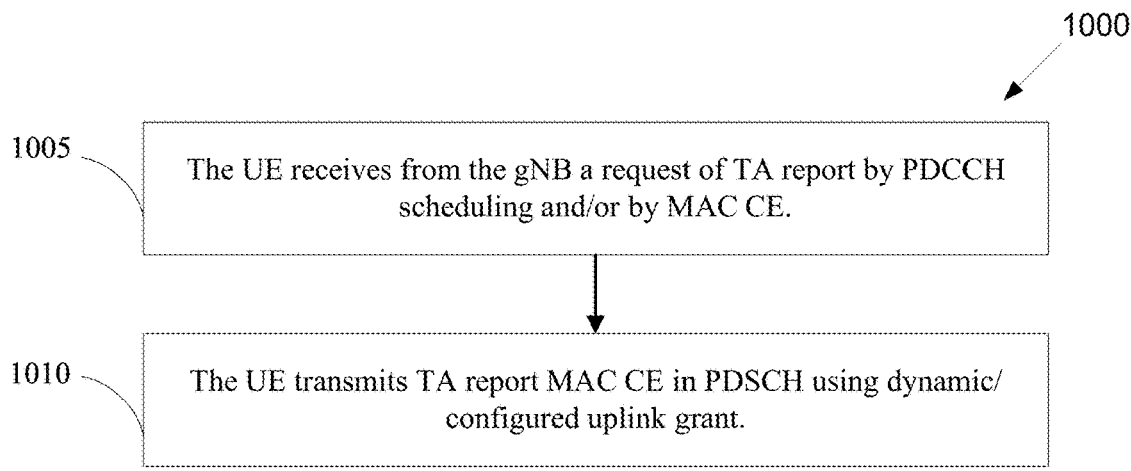
FIG. 10 illustrates a flowchart of UE behavior to transmit TA report MAC CE requested by DCI or MAC CE in RRC_CONNECTED state according to embodiments of the present disclosure.

FIG. 10 illustrates a flowchart UE behavior 1000 to transmit TA report MAC CE requested by DCI or MAC CE in an RRC_CONNECTED state according to embodiments of the present disclosure. The UE behavior 1000 as may be performed by a UE (e.g., 111-116 as illustrated in FIG. 1). An embodiment of the UE behavior 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In one embodiment as shown in FIG. 10, at operation 1005, the UE receives from the gNB a request of TA report by PDCCH scheduling and/or by MAC CE. In one example, the UE can receive a TA report indication in DCI format with or without downlink assignment where the indication can use any spare bit or repurpose any bit in the DCI format. In another example, the TA report request can be indicated in a MAC CE in PDSCH. The MAC CE can include activation of periodic and/or aperiodic and/or semi-persistent TA report. As an example, the MAC CE is identified by a subheader with LCID or eLCID and contains fields of one-bit indication of TA report request, and/or activation bits for periodic and/or aperiodic and/or semi-persistent TA report, and/or deactivation bits for periodic and/or aperiodic and/or semi-persistent TA report. At operation 1010, the UE transmits TA report MAC CE in PDSCH using dynamic/configured uplink grant.

Figure 11:
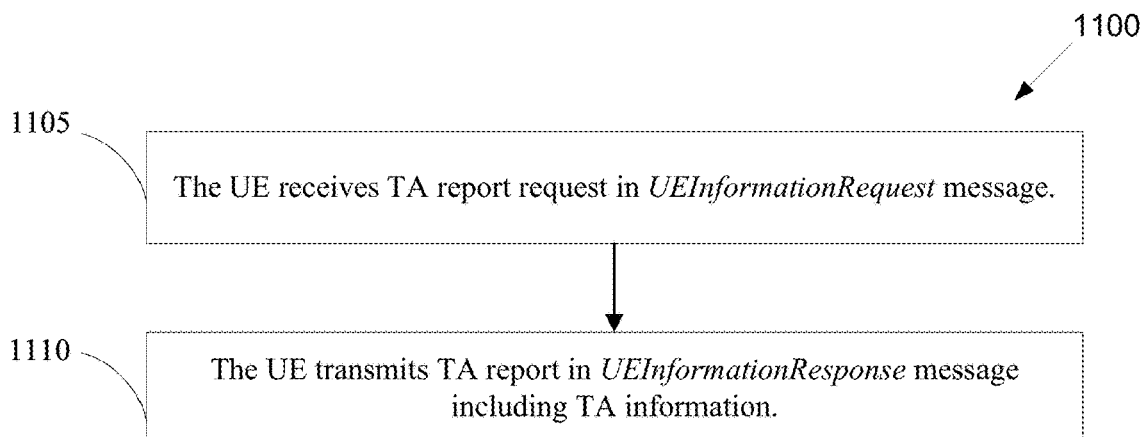
FIG. 11 illustrates a flowchart of UE behavior to transmit a TA report in a UE information procedure in an RRC_CONNECTED state according to embodiments of the present disclosure.

FIG. 11 illustrates a flowchart of UE behavior 1100 to transmit a TA report in a UE information procedure in an RRC_CONNECTED state according to embodiments of the present disclosure. The UE behavior 1100 as may be performed by a UE (e.g., 111-116 as illustrated in FIG. 1). An embodiment of the UE behavior 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In another embodiment shown in FIG. 11, the TA report can be requested by the UE information procedure as illustrated in 3GPP standard specification. At operation 1105, the UE receives the UEInformationRequest message with the ta-ReportRequest is set to true, then at operation 1110, the UE may, only after successful security activation, include TA information if available in the UEInformationResponse message.

One example of the TA request in the UEInformationRequest message and TA report in the UEInformationResponse message in UE information procedure is as shown in TABLE 1.

TABLE 1

TA request

```
UEInformationRequest-v1700-IEs ::= SEQUENCE {
  successHO-ReportReq-r17   ENUMERATED {true}   OPTIONAL, --
    Need N
  coarseLocationRequest-r17 ENUMERATED {true}   OPTIONAL, --
    Need N
  ta-ReportRequest-r17   ENUMERATED {true}   OPTIONAL, --
    Need N
  nonCriticalExtension   SEQUENCE { }   OPTIONAL
}
    UEInformationRequest-IEs field descriptions
    ta-ReportRequest
    This field is used to request UE to report TA information.
UEInformationResponse-v1700-IEs ::= SEQUENCE {
  successHO-Report-r17   SuccessHO-Report-r17   OPTIONAL,
  connEstFailReportList-r17   ConnEstFailReportList-r17   OPTIONAL,
  coarseLocationInfo-r17   OCTET STRING   OPTIONAL,
  ta-Info-r17   BIT STRING (SIZE (14))   OPTIONAL,
  nonCriticalExtension   SEQUENCE { }   OPTIONAL
}
    UEInformationResponse-IEs field descriptions
    ta-Info
    This field is used to provide TA information with the unit of slot length.
```

The NW can configure the UE to transmit TA reports periodically and/or semi-persistently and/or a periodically according to UE capability of supporting periodic and/or semi-persistent TA report in an RRC_CONNECTED state. The periodic and/or semi-persistent TA report in an RRC_CONNECTED state can be a mandatory feature or an optional feature. If the TA report is an optional feature, the corresponding UE capability indication can be defined per UE or per band or per band combination.

Figure 12:
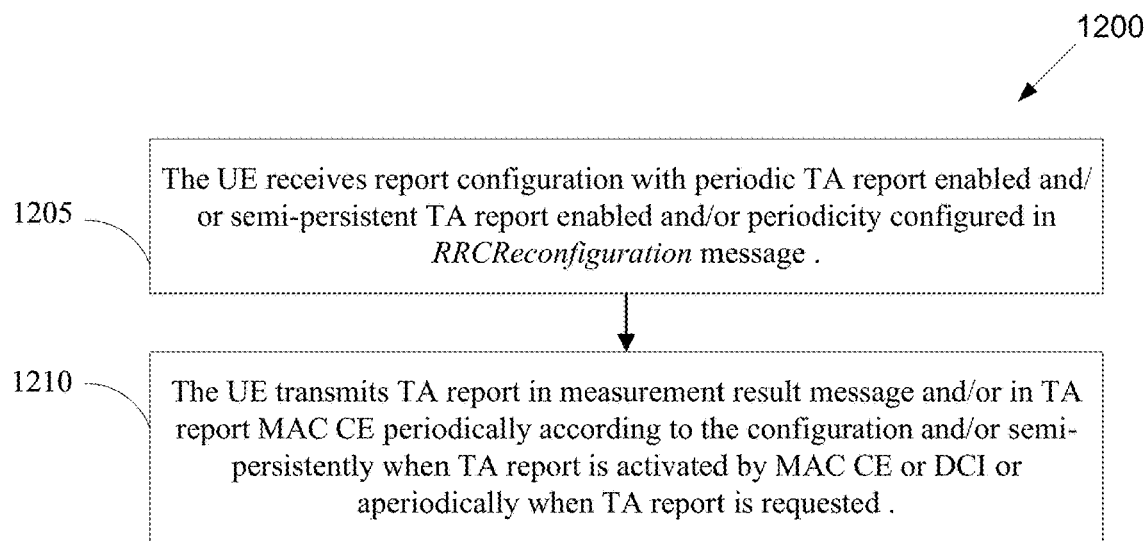
FIG. 12 illustrates a flowchart of UE behavior to transmit a TA report periodically or semi-persistently in an RRC_CONNECTED state according to embodiments of the present disclosure.

FIG. 12 illustrates a flowchart of UE behavior 1200 to transmit a TA report periodically or semi-persistently in an RRC_CONNECTED state according to embodiments of the present disclosure. The UE behavior 1200 as may be performed by a UE (e.g., 111-116 as illustrated in FIG. 1). An embodiment of the UE behavior 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

In one embodiment shown in FIG. 12, at operation 1205, the UE receives configuration with periodic TA report enabled and/or semi-persistent TA report enabled and/or periodicity configured in RRCReconfiguration message. At operation 1210, the UE transmits TA report in measurement result message and/or in TA report MAC CE periodically according to the configuration or semi-persistently when TA report is activated by MAC CE or DCI.

In one example, the periodic and/or semi-persistent TA report and the associated periodicity can be configured in RRM measurement and report configuration in IE reportConfigNR as illustrated in 3GPP standard specification. For the measId for which the measurement reporting procedure was triggered, the UE may set the measResults within the MeasurementReport message including ta-Info if available if the ta-ReportRequest-periodic is set to true in the corresponding reportConfig for this measId; and/or if the ta-ReportRequest-semiPersistent is set to true in the corresponding reportConfig for this measId and the semi-persistent TA report is activated by MAC CE or DCI.

TABLE 2

Periodic and/or semi-persistent TA report

```
PeriodicalReportConfig ::=   SEQUENCE {
   rsType   NR-RS-Type,
   reportInterval   ReportInterval,
   reportAmount   ENUMERATED {r1, r2, r4, r8, r16, r32, r64,
   infinity},
   reportQuantityCell   MeasReportQuantity,
   maxReportCells   INTEGER (1..maxCellReport),
   reportQuantityRS-Indexes   MeasReportQuantity   OPTIONAL, --
Need R
   maxNrofRS-IndexesToReport   INTEGER
(1..maxNrofIndexesToReport)   OPTIONAL, -- Need R
   includeBeamMeasurements   BOOLEAN,
   use AllowedCellList   BOOLEAN,
   ...,
   [[
   measRSSI-ReportConfig-r16   MeasRSSI-ReportConfig-r16
OPTIONAL, -- Need R
   includeCommonLocationInfo-r16   ENUMERATED {true}
OPTIONAL, -- Need R
   includeBT-Meas-r16   SetupRelease {BT-NameList-r16}
OPTIONAL, -- Need M
   include WLAN-Meas-r16   SetupRelease {WLAN-NameList-r16}
OPTIONAL, -- Need M
   includeSensor-Meas-r16   SetupRelease {Sensor-NameList-r16}
OPTIONAL, -- Need M
   ul-DelayValueConfig-r16   SetupRelease { UL-DelayValueConfig-
r16 }   OPTIONAL, -- Need M
   reportAddNeighMeas-r16   ENUMERATED {setup}
OPTIONAL -- Need R
   ]],
   [[
   ul-ExcessDelayConfig-r17   SetupRelease { UL-
ExcessDelayConfig-r17 }   OPTIONAL, -- Need M
   coarseLocationRequest-r17   ENUMERATED {true}
OPTIONAL, -- Need R
reportQuantityRelay-r17   SL-MeasReportQuantity-r16
OPTIONAL, -- Need R
ta-ReportRequest-periodic   ENUMERATED {true}
OPTIONAL, -- Need R
ta-ReportRequest-semiPersistent   ENUMERATED {true}
OPTIONAL, -- Need R
ta-ReportInterval   ReportInterval   OPTIONAL -- Need R
   ]]
}
         PeriodicalReportConfig field descriptions
   ta-ReportRequest-periodic, ta-ReportRequest-semiPersistent
   This field is used to request UE to report TA information.
   ta-ReportInterval
   This field is used to configure UE with TA report periodicity.
MeasResults ::=   SEQUENCE {
   measId   MeasId,
   measResultServingMOList   MeasResultServMOList,
   measResultNeighCells   CHOICE {
   measResultListNR   MeasResultListNR,
   ...,
   measResultListEUTRA   MeasResultListEUTRA,
   measResultListUTRA-FDD-r16 MeasResultListUTRA-FDD-r16,
sl-MeasResultsCandRelay-r17   OCTET STRING -- Contains PC5
SL-MeasResultListRelay-r17
   }   OPTIONAL,
   ...,
```

TABLE 2-continued

Periodic and/or semi-persistent TA report

```
[[
   measResultServFreqListEUTRA-SCG
MeasResultServFreqListEUTRA-SCG   OPTIONAL,
   measResultServFreqListNR-SCG MeasResultServFreqListNR-
SCG   OPTIONAL,
   measResultSFTD-EUTRA MeasResultSFTD-EUTRA
OPTIONAL,
   measResultSFTD-NR   MeasResultCellSFTD-NR   OPTIONAL
   ]],
   [[
   measResultCellListSFTD-NR   MeasResultCellListSFTD-NR
OPTIONAL
   ]],
   [[
   measResultForRSSI-r16   MeasResultForRSSI-r16   OPTIONAL,
   locationInfo-r16   LocationInfo-r16   OPTIONAL,
   ul-PDCP-DelayValueResultList-r16 UL-PDCP-
DelayValueResultList-r16   OPTIONAL,
   measResultsSL-r16   MeasResultsSL-r16   OPTIONAL,
   measResultCLI-r16   MeasResultCLI-r16   OPTIONAL
   ]],
   [[
   measResultRxTxTimeDiff-r17 MeasResultRxTxTimeDiff-r17
OPTIONAL,
   sl-MeasResultServingRelay-r17 OCTET STRING   OPTIONAL,
         -- Contains PC5 SL-MeasResultRelay-r17
   ul-PDCP-ExcessDelayResultList-r17 UL-PDCP-
ExcessDelayResultList-r17   OPTIONAL,
   coarseLocationInfo-r17   OCTET STRING   OPTIONAL,
   ta-Info-r17   BIT STRING (SIZE (14))   OPTIONAL
   ]]
}
         MeasResults field descriptions
   ta-Info
   This field is used to provide TA information with the unit of
   slot length.
```

With NGSO satellites, the gNB can provide either quasi-Earth-fixed cell coverage or Earth-moving cell coverage, while gNB operating with GSO satellite can provide Earth fixed cell coverage. Due to different properties of GSO and NGSO, different types of cells can be supported in NTN, which are the earth-fixed cell, the quasi-earth-fixed cell, and the earth-moving cell. For a certain type of NTN payload/cell, specific features or functionalities are desired to be supported by the UE for radio access.

For NTN in Release 17 specification, both a contention-based and a contention-free random access procedures are supported for UE to perform UL synchronization when setting up RRC connection and during handover procedure.

In Release-18 NTN enhancement, service link switch without PCI change is considered for which beam-level mobility is required. However, when switching to a target satellite, the UE may need to perform UL synchronization by a random access procedure. How to trigger a UL/DL synchronization and/or a random access procedure for service link switch (e.g., due to satellite change) may be specified.

The present disclosure specifies solutions to trigger a UL/DL synchronization and/or a random access procedure for service link switch in NTN. In the present disclosure, a synchronization operation can refer to a DL synchronization and/or RA for UL synchronization and/or RACH-less synchronization.

In the present disclosure, a service link switch between NTN payloads (e.g., satellite, HAPS) or cells can refer to hard switch, where one NTN payload/cell serves an area until a certain time and another NTN payload/cell serves the same area since that time so that the old NTN payload/cell and the new NTN payload/cell serves the same area with no overlap in time and the new cell uses the same PCI and configuration as the old cell. The service link switch between NTN payloads (e.g., satellite, HAPS) or cells can also refer to soft switch, where one NTN payload/cell serves an area until a certain time and another NTN payload/cell serves the same area from an earlier time so that the old NTN payload/cell and the new NTN payload/cell serves the same area with some overlap in time and the new cell uses the same PCI and configuration as the old cell. In this disclosure, the old NTN payload/cell is referred as source satellite/cell and the new NTN payload/cell is referred as target satellite/cell.

The NW can request the UE to perform a DL synchronization to the current serving cell associated to a target satellite whenever there is a need. The NW can request the UE to perform UL synchronization by random access (RA) (including CFRA, CBRA, 2-step RA, 4-step RA) to the current serving cell associated to a target satellite whenever there is a need. The NW can request the UE to perform RACH-less switch to the current serving cell associated to a target satellite whenever there is a need. The DL synchronization and/or RA for UL synchronization and/or RACH-less switch can be triggered and performed by the following embodiments.

In one embodiment, the configuration for the service link switch (e.g., parameters in SIB19, IE ntn-Config as illustrated in 3GPP standard specification) is pre-configured by system information (SI) and/or UE-dedicated RRC messages (e.g., RRCReconfiguration message). In one example, the NW can indicate the configuration (e.g., IE ntn-config) associated to a neighbor satellite/cell to be applied for the service link switch. A new field in the source cell's neighbor satellite/cell configuration in SIB19 can be added for this indication. In another example, the service link switch configuration can include one or multiple configuration IDs of the configuration (e.g., IE ntn-config) associated to a neighbor satellite/cell to be applied for the service link switch, and/or one or multiple PCIs to which the associated satellite assistance information provided in the neighbor cell configuration is to be applied for the service link switch.

In one example, the configuration for the service link switch can include a dedicated RACH configuration for CFRA (e.g., 2-step RA, 4-step RA) including random access parameters (e.g., SSB index, ra-PreambleIndex) for UE to perform a random access procedure for UL synchronization for the service link switch. For one example, the service link switch configuration can include RACH-less switch configuration, including the UL grant (e.g., configured grant for UL transmission), and/or the offset parameter for TA, and/or TA group (TAG) configuration. As another example, the configuration for the service link switch can include a dedicated PDCCH configuration (e.g., time and/or frequency resource to receive PDCCH) to be used to receive the PDCCH order triggering a DL synchronization and/or RA for UL synchronization and/or RACH-less switch.

In yet another example, the service link switch configuration includes a switch time information. The switch time information can include a duration parameter for a switch timer which is to be started by the UE upon initiating a DL synchronization and/or RA for UL synchronization and/or RACH-less switch for the service link switch. The switch time information can include a start time and/or an end time. The start time and/or the end time can be indicated by absolute time, e.g., UTC time. The start time indicates the time after which the UE can initiates a DL synchronization and/or RA for UL synchronization and/or RACH-less switch for the service link switch. The t-service parameter, as illustrated in 3GPP standard specification, for the source satellite can be included in the service link switch configuration to be reused as the start time and/or the end time. The end time indicates before which the UE may initiate a DL synchronization and/or RA for UL synchronization and/or RACH-less switch for the service link switch.

Figure 13:
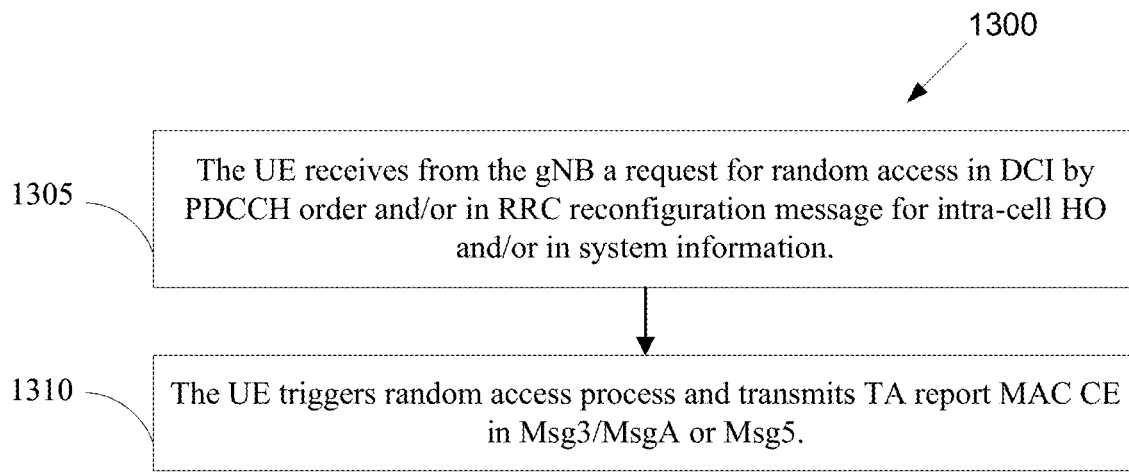
FIG. 13 illustrates a flowchart of UE behavior for a NW-requested RA in an RRC_CONNECTED state according to embodiments of the present disclosure.

FIG. 13 illustrates a flowchart of UE behavior 1300 for a NW-requested RA in an RRC_CONNECTED state according to embodiments of the present disclosure. The UE behavior 1300 as may be performed by a UE (e.g., 111-116 as illustrated in FIG. 1). An embodiment of the UE behavior 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

In one embodiment as shown in FIG. 13, at operation 1305, the UE receives from the gNB a request for a DL synchronization and/or RA for UL synchronization and/or RACH-less switch by PDCCH order. In one example, the UE can receive an indication in DCI in PDCCH order with dedicated RACH preamble for the service link switch. PDCCH order is sent via DCI Format 1_0 with C-RNTI CRC scrambled, containing SSB index, ra-PreambleIndex, and PRACH Mask Index, and a TA report request using any spare bits or repurposing any bit. In the case of 2-step RACH procedure, PDCCH order contains SSB index, ra-PreambleIndex and msgA-SSB-SharedRO-MaskIndex, and a TA report request using any spare bits in DCI format. For the SSBs broadcast by the target satellite, the SSB indices and associated frequency/time information for the target cell's SSBs can be configured in RRC reconfiguration message or provided in system information for UE to perform a DL synchronization and/or RA for UL synchronization and/or RACH-less switch.

For PDCCH order triggered service link switch, in one example, a one-bit indication can be included in the DCI of the PDCCH order to indicate a trigger of service link switch to the target satellite, and the pre-configured service link switch configuration is to be applied by the UE for the DL synchronization and/or RA for UL synchronization and/or RACH-less switch. A new bit or an existing bit in DCI Format 1_0 can be defined or repurposed to indicate the trigger of the DL synchronization and/or RA for UL synchronization and/or RACH-less switch for service link switch.

As another example, a ra-PreambleIndex and/or an SSB index and/or a PRACH Mask Index and/or a RA occasion that is configured for service link switch can be indicated in the DCI of the PDCCH order. If such a PDCCH order is received, the UE initiates a DL synchronization and/or RA for UL synchronization for service link switch by applying the indicated ra-PreambleIndex and/or an SSB index and/or a PRACH Mask Index and/or a RA occasion and the pre-configured service link switch configuration.

In yet another example, an NTN-specific configuration ID (e.g., the logical index of satellite configuration for neighbor cells) and/or the PCI to which the associated satellite assistance information provided in the neighbor cell configuration is to be applied for the service link switch can be indicated in the DCI of the PDCCH order. Upon receiving a PDCCH order containing the ID/PCI for an NTN-specific configuration, the UE applies the indicated NTN-specific configuration and the pre-configured service link switch configuration for RA for a DL synchronization and/or UL synchronization and/or RACH-less switch for service link switch.

In yet another example, if a dedicated PDCCH configuration (e.g., time and/or frequency resource to receive PDCCH) to receive the PDCCH order is configured, and if the UE receives a PDCCH order based on the dedicated PDCCH configuration, the UE initiates a DL synchronization and/or RA for UL synchronization and/or RACH-less switch for service link switch by applying the pre-configured service link switch configuration.

In another embodiment for operation 1305, the UE can receive a HO/switch command by RRC reconfiguration message for intra-cell handover and/or intra-cell service link switch so that the UE may perform a DL synchronization and/or a random access procedure for UL synchronization and/or RACH-less switch to the current serving cell (e.g., PCI unchanged) associated with the target satellite. The HO/switch command can include the service link switch configuration mentioned above. In the HO/switch command, the satellite assistance information for the new serving satellite, e.g., information included in IE ntn-Config, as illustrated in 3GPP standard specification, and/or the service link switch indication can be provided for UE perform a DL synchronization and/or a random access procedure for UL synchronization and/or RACH-less switch.

In one example, the service link switch indication can be explicit by a one-bit field, e.g., service link switch enabled. In another example, the service link switch indication can be implicitly known by the UE when different satellite ephemeris than the current serving satellite is included in the HO/switch command. In one example, a time threshold and/or a duration can be configured in the intra-cell HO/switch command. The time threshold indicates the absolute time before which the UE may initiate a DL synchronization and/or a random access procedure for UL synchronization and/or RACH-less switch. Or the duration can indicate the time window during which the UE may initiate a DL synchronization and/or a random access procedure for UL synchronization and/or RACH-less switch.

In yet another example, the HO/switch command can include the IE reconfigurationWithSync including the target cell PCI and/or configuration same as the source cell PCI and/or configuration. Upon receiving the HO/switch command with explicit or implicit service link switch, the UE initiates a DL synchronization and/or a random access procedure for UL synchronization and/or RACH-less switch to the target satellite with serving cell PCI unchanged. If the HO/switch command includes the IE reconfigurationWithSync, the UE performs the procedure related to reconfigurationWithSync as specified in as illustrated in 3GPP standard specification.

In one more embodiment for operation 1305, the UE is requested to perform RA if indicated in system information (e.g., SIB19) by a new field, e.g., ra-request. If the UE acquires SIB19 with the field ra-request presented or enabled, the UE performs a random access procedure to the current serving cell or the indicated cell (e.g., with same or different PCI as the current serving cell) by applying the satellite assistance information provided in the newly acquired SIB19. The service link switch indication can be included in system information (e.g., SIB19). In one example, the service link switch indication can be explicit by a one-bit field. In another example, the service link switch indication can be implicitly known by the UE when different satellite ephemeris than the current serving satellite is included in the system information. In one example, a time threshold and/or a duration can be configured associated with the random access request indication. The time threshold indicates the absolute time before which the UE may initiate a random access procedure. Or the duration can indicate the time window during which the UE may initiate a random access procedure.

In one another embodiment for operation 1305, the UE can receive a MAC CE triggering the service link switch. The MAC CE can be identified by a LCID or an eLCID. In one example, upon receiving the MAC CE triggering service link switch, the UE initiates a DL synchronization and/or RA for UL synchronization and/or RACH-less switch for the service link switch by applying the pre-configured service link switch configuration in RRC signaling. In another example, the MAC CE payload can include the configuration ID of the configuration (e.g., IE ntn-config) associated to a neighbor satellite/cell to be applied for the service link switch, and/or the PCI to which the associated satellite assistance information provided in the neighbor cell configuration is to be applied for the service link switch. Upon receiving the MAC CE triggering service link switch with payload indicating the configuration, the UE initiates a DL synchronization and/or RA for UL synchronization and/or RACH-less switch for the service link switch by applying the pre-configured service link switch configuration based on the indication in the MAC CE payload. If there is only one configuration ID and/or PCI configured for the target satellite/cell in the service link switch, the configuration ID and/or PCI indication in the MAC CE payload can be absent.

At operation 1310, upon receiving the service link switch trigger signal as aforementioned (e.g., PDCCH order, RRC signaling, MAC CE), the UE initiates a DL synchronization and/or RA for UL synchronization and/or RACH-less switch by applying the pre-configured service link switch configuration based on indication in PDCCH order and/or MAC CE and/or RRC signaling (e.g., intra-cell HO command). The UE stops the validity timer (e.g., T430) for the serving cell if running, and/or (re)-starts the timer (e.g., T430) for the serving cell that controls the validity of the new satellite assistance information for UL synchronization (e.g., ephemeris, common TA parameters). If there is no dedicated RACH preamble the UE may trigger CBRA procedure and send C-RNTI MAC CE in msg3 for contention resolution. The UE can include TA report MAC CE in MsgA or Msg3 or Msg5.

In one embodiment of operation 1310, if a switch timer is configured, the UE starts the switch timer upon receiving the service link switch trigger signal, and initiates a DL synchronization and/or RA for UL synchronization and/or RACH-less switch for the service link switch by applying the pre-configured service link switch configuration based on the indication in the trigger signal. The UE stops the validity timer (e.g., T430) for the serving cell if running, and/or (re)-starts the timer (e.g., T430) for the serving cell that controls the validity of the new satellite assistance information for UL synchronization (e.g., ephemeris, common TA parameters).

In another embodiment of operation 1310, if a switch timer and a start time (e.g., t-Service) for the service link switch is configured, at the start time, the UE starts the switch timer, and initiates a DL synchronization and/or RA for UL synchronization and/or RACH-less switch for the service link switch by applying the pre-configured service link switch configuration based on the indication in the trigger signal. The UE stops the validity timer (e.g., T430) for the serving cell if running, and/or (re)-starts the timer (e.g., T430) for the serving cell that controls the validity of the new satellite assistance information for UL synchronization (e.g., ephemeris, common TA parameters). In one example, the UE can use the t-Service parameter provided in the source cell's system information (e.g., SIB19) as the start time.

In yet another embodiment of operation 1310, if an end time (e.g., t-Service) for the service link switch is configured, upon receiving the service link switch trigger signal, the UE starts a switch timer by setting the configured end time as the expiry time of the timer, and initiates a DL synchronization and/or RA for UL synchronization and/or RACH-less switch for the service link switch by applying the pre-configured service link switch configuration based on the indication in the trigger signal. The UE stops the validity timer (e.g., T430) for the serving cell if running, and/or (re)-starts the timer (e.g., T430) for the serving cell that controls the validity of the new satellite assistance information for UL synchronization (e.g., ephemeris, common TA parameters). In one example, the UE can use the t-Service parameter provided in the source cell's system information (e.g., SIB19) as the end time.

If the service link switch trigger signal is received by PDCCH order or by MAC CE, the lower layer(s) (e.g., PHY layer, MAC layer) indicates to the upper layer (e.g., RRC layer) that the service link switch trigger is received, and the upper layer (e.g., RRC layer) starts the switch timer.

If the switch timer is started, the UE stops the timer upon the RA to the target cell or RACH-less switch to the target cell is successfully completed. In an example, when the first UL transmission (e.g., a MAC PDU including a TA report MAC CE) is sent to the target cell, the UE considers the RACH-less switch is successfully completed. Upon the RA to the target cell or the RACH-less switch to the target cell is completed successfully, the lower layer (e.g., MAC layer) indicates to the upper layer (e.g., RRC layer) that a RA to the target cell or the RACH-less switch to the target cell is completed successfully, and the upper layer stops the switch timer. If the timer expires, the UE performs initial access (e.g., 4-step CBRA, 4-step CFRA) to the target cell or performs RRC-reestablishment procedure.

The UE can initiate a random access procedure for UL synchronization to the current serving cell whenever the configured event is fulfilled.

Figure 14:
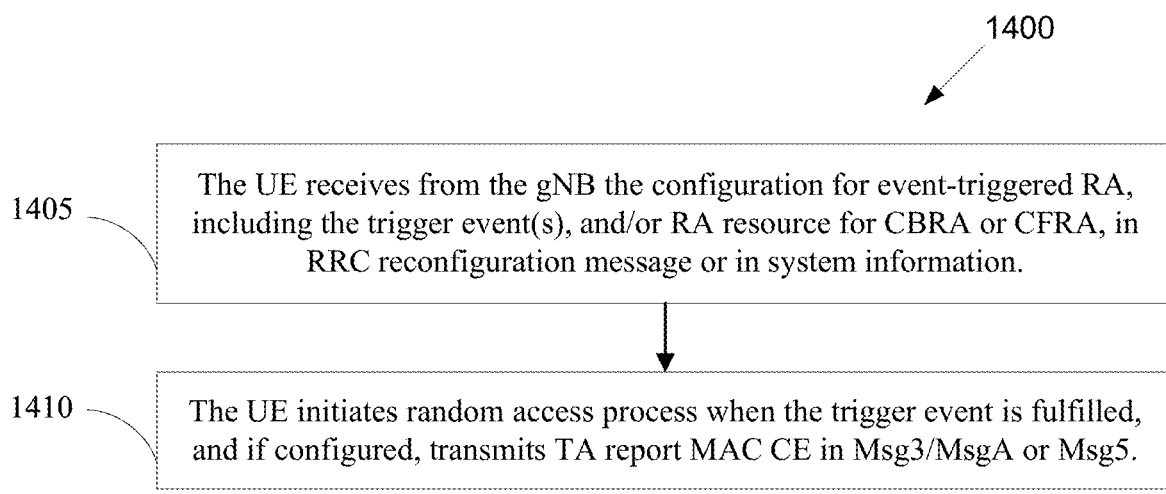
FIG. 14 illustrates a flowchart of UE behavior for an event-triggered RA in an RRC_CONNECTED state according to embodiments of the present disclosure.

FIG. 14 illustrates a flowchart of UE behavior 1400 for an event-triggered RA in an RRC_CONNECTED state according to embodiments of the present disclosure. The UE behavior 1400 as may be performed by a UE (e.g., 111-116 as illustrated in FIG. 1). An embodiment of the UE behavior 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

In one embodiment as shown in FIG. 14, at operation 1405, the UE receives from the gNB the configuration for event-triggered RA in RRC reconfiguration message or in system information. The configuration includes the trigger event, and/or RA resource configuration for CBRA or CFRA. The network can configure event-triggered RA based on UE capability. The UE capability of supporting event-triggered RA can be defined as an optional or mandatory capability with UE capability indication. It can be defined as per UE capability or per band capability.

In one example, the trigger event includes a TA offset threshold. If the UE's current TA value (e.g., TA for service link, or TA including service link and common TA) estimated based on the newly acquired satellite assistance information (i.e., ephemeris and common TA parameters) is changed from the last TA value estimated based on the last acquired satellite assistance information by an offset larger than the configured threshold, the UE initiates RA procedure by using the new satellite assistance information.

In another example, the trigger event includes a TA offset threshold and a checking periodicity. The UE checks TA value (e.g., TA for service link, or TA including service link and common TA) periodically with the configured period. If the UE's current TA value estimated based on the current satellite location and UE location is changed from the last TA value estimated by an offset larger than the configured threshold, the UE initiates RA procedure by using the current satellite assistance information.

In an embodiment of operation 1405, the trigger event can refer to a switch window for UE to perform random access towards the new/target cell/satellite. The NW can configure a switch window which can be indicated by a start time and a duration. As an example, t-Service parameter can be reused as the start time of the switch window, so that UE uses the t-Service parameter as the start time of the switch time. In another example, the switch start time can be indicated as an absolute time, e.g., UTC time. The time window configuration can be included in a UE-dedicated message (e.g., RRCReconfiguration message) or in system information (e.g., SIB19). The NW can configure the assistance information for the target cell/satellite (e.g., ntn-Config including ephemeris, common TA parameters, N_TA parameter for TA derivation, etc.) to be associated with the switch window. The UE uses the associated assistance information to perform RACH or RACH-less switch to the target cell/satellite during the switch window.

For example, the UE applies the ephemeris and/or common TA parameters and/or N_TA parameter in the assistance information for TA pre-compensation and/or Doppler shift pre-compensation for UL synchronization in RACH or RACH-less switch during the switch window. If the assistance information for the target cell/satellite is provided in SIB19 as a neighbor cell configuration (i.e., the target cell/satellite is one of the neighbor cell/satellite configured in SIB19), the NW can associate the PCI of the target cell to the switch window.

At operation 1410, the UE triggers a random access procedure with the information received. If there is no dedicated RACH preamble the UE may trigger CBRA procedure and send C-RNTI MAC CE in msg3 for contention resolution. The UE can include TA report MAC CE in MsgA or Msg3 or Msg5 if TA report is enabled by RRC configuration.

In an embodiment of operation 1410, if the switching window is configured, upon the trigger event of the switch window is fulfilled, i.e., upon the start time of the switch window, the UE starts a timer from the start time and sets the timer duration as the switch window duration, then UE performs RACH or RACH-less switch to the target cell/satellite by applying the associated assistance information for the target cell/satellite. The UE stops the validity timer (e.g., T430) for the serving cell if running, and/or (re)-starts the timer (e.g., T430) for the serving cell that controls the validity of the new satellite assistance information for UL synchronization (e.g., ephemeris, common TA parameters).

For example, upon the timer starts for the switch window, the UE restarts the T430 according to the assistance information for the target cell/satellite. Upon the timer starts for the switch window, the UE restarts the time-alignment timer if RACH-less switch is performed by UE autonomous derivation of TA. When the switch timer is running, the UE can suspend all DL and/or UL operation (e.g., DL/UL HARQ, scheduling request, buffer status report, etc.) except RACH and/or RACH-less procedure operation towards the target cell/satellite. If the RACH or RACH-less switch to the target cell/satellite is successfully completed while the timer is running, the UE stops the timer. If the timer expires, the UE declares the switch is failed. Upon the failure of the switch, the UE can perform random access procedure to the serving cell using the associated assistance information for the target cell/satellite or beam failure recovery or RRC re-establishment procedure.

As an example, the timer for the switch window can be an RRC layer timer. The timer starts upon the current time is the configured start time. The timer stops upon receiving from the lower layer (e.g., MAC layer) an indication of the successful completion of the random access procedure or RACH-less procedure to the target cell/satellite. Upon the expiry of the timer, the UE performs RRC re-establishment procedure. In another example, the timer for the switch window can be a MAC layer timer. The timer starts upon the current time is the configured start time. The timer stops upon the successful completion of the random access procedure or RACH-less procedure to the target cell/satellite. Upon the expiry of the timer, the UE determines beam failure for the SpCell (i.e., current serving cell) and initiates a random access procedure to the SpCell for beam failure recovery. Alternatively, an indication of switching failure is sent to the RRC layer and UE performs RRC re-establishment procedure.

In one embodiment, if the assistance information (e.g., ntn-Config including ephemeris, common TA parameters, etc.) for the target cell/satellite is different than the current configuration for the serving/source cell, the UE stops the current running T430 and/or restarts the T430 according to the assistance information for the target cell/satellite; otherwise, (i.e., if the assistance information (e.g., ntn-Config including ephemeris, common TA parameters, etc.) for the target cell/satellite is the same as the current configuration for the serving/source cell), UE keeps the current running T430 and does not restart T430.

Figure 15:
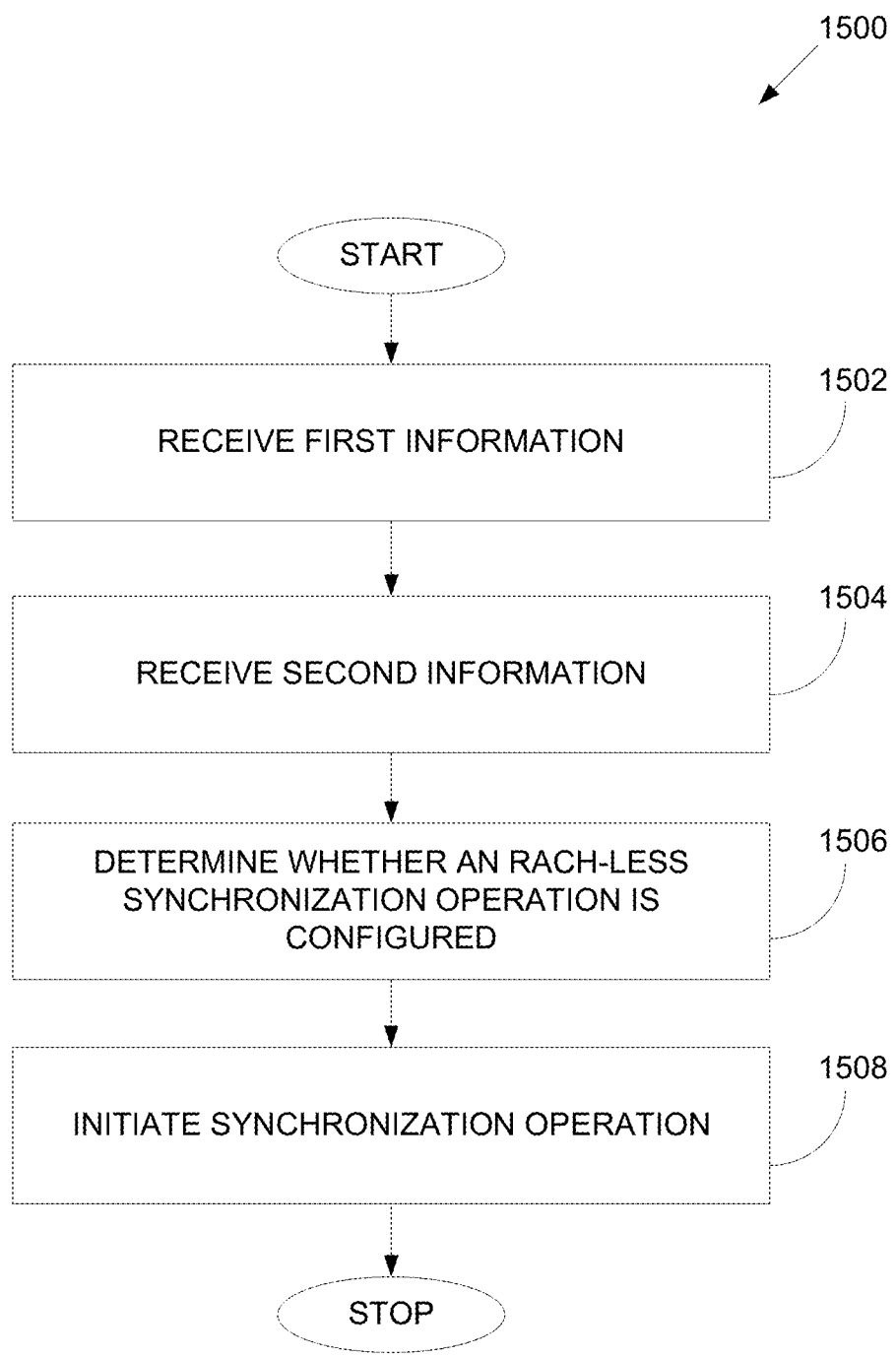
FIG. 15 illustrates a flowchart of UE method for a TA report in an NTN according to embodiments of the present disclosure.

FIG. 15 illustrates a flowchart of UE method 1500 for a timing advance report in an NTN according to embodiments of the present disclosure. The UE method 1500 as may be performed by a UE (e.g., 111-116 as illustrated in FIG. 1). An embodiment of the UE method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, the method 1500 begins at step 1502. In step 1502, the UE receives, from a BS, first information including satellite assistance information for a target satellite.

In step 1504, the UE receives, from the BS, second information including timing information, wherein the timing information includes at least one of a start time and a time duration for a synchronization operation.

In step 1506, the UE determines whether a RACH-less synchronization operation is configured.

In step 1508, the UE initiates, based on the satellite assistance information and the timing information, the synchronization operation by performing a RA procedure upon a determination that the RACH-less synchronization operation is not configured.

In one embodiment, the UE receives third information including RACH-less synchronization information that comprises a TA parameter.

In one embodiment, the UE initiates, based on the RACH-less synchronization information, the synchronization operation by performing the RACH-less synchronization operation using the TA parameter. In such embodiment, the satellite assistance information includes at least one of ephemeris information, common TA parameters, an offset parameter, an epoch time, and a validity duration, and the first, second, and third information is received via system information or a UE-dedicated RRC message.

In one embodiment, the UE receives an UL grant and performs a first UL transmission after the RACH-less synchronization operation to the target satellite using the UL grant.

In one embodiment, the UE receives a NW trigger indication for the synchronization operation. In such embodiments, the NW trigger indication is identified as: an intra-cell handover command via an RRC signaling, an indication in DCI included in a PDCCH, or a MAC CE including a configuration ID of a target satellite.

In one embodiment, the UE starts or restarts a validity timer for the target satellite when initiating a UL synchronization operation and transmits a TA report MAC CE for the target satellite in at least one of: a Msg3 or a MsgA transmitted in the RA procedure, a first UL transmission after the RA procedure, or the first UL transmission without a RACH.

In one embodiment, the UE starts a timer when the UE receives a NW trigger indication, or starts the timer based on the start time, and sets a timer duration of the timer as the time duration.

In one embodiment, the UE stops the timer when the RA procedure is completed or the RACH-less synchronization operation is completed and, when the timer expires, performs the RA procedure to a serving cell based on the satellite assistance information for the target satellite or perform a RRC re-establishment procedure.

In one embodiment, the UE receives, from the BS, a TA report request that is identified as: an intra-cell handover command via an RRC signaling, or a request indication in DCI included in a PDCCH associated with a RACH, performs the RA and generate a TA report MAC CE, and transmits, to the BS, the TA report MAC CE included in at least one of a Msg3, a MsgA, and a message after the RA procedure.

In one embodiment, the UE receives, from the BS, a TA report request that is identified as: a MAC CE including at least one of a periodic TA report request, an aperiodic TA report request, and a semi-persistent TA report request, a request indication included in a RRC message, the RRC message being a UE information request message, or an RRC reconfiguration message including a TA measurement configuration and a TA report configuration, the TA report configuration indicating at least one of the periodic TA report request, the aperiodic TA report request, and the semi-persistent TA report request; generates the TA report; and transmits, to the BS, the TA report in an RRC message or in a MAC CE included in a UL message.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive, from a base station (BS), first information including satellite assistance information for a target satellite, and
receive, from the BS, second information including timing information, wherein the timing information includes at least one of a start time and a time duration for a synchronization operation; and
a processor operably coupled to the transceiver, the processor configured to:
determine whether a random access channel-less (RACH-less) synchronization operation is configured, and
initiate, based on the satellite assistance information and the timing information, the synchronization operation by performing a random access (RA) procedure upon a determination that the RACH-less synchronization operation is not configured.

2. The UE of claim 1, wherein:
the transceiver is further configured to receive third information including RACH-less synchronization information that comprises a timing advance (TA) parameter;
the processor is further configured to initiate, based on the RACH-less synchronization information, the synchronization operation by performing the RACH-less synchronization operation using the TA parameter;
the satellite assistance information includes at least one of ephemeris information, common TA parameters, an offset parameter, an epoch time, and a validity duration; and
the first, second, and third information is received via system information or a UE-dedicated radio resource control (RRC) message.

3. The UE of claim 1, wherein the transceiver is further configured to:
receive an UL grant; and
perform a first UL transmission after the RACH-less synchronization operation to the target satellite using the UL grant.

4. The UE of claim 1, wherein:
the transceiver is further configured to receive a network (NW) trigger indication for the synchronization operation; and
the NW trigger indication is identified as:
an intra-cell handover command via an RRC signaling,
an indication in downlink control information (DCI) included in a physical downlink control channel (PDCCH), or
a medium access control control element (MAC CE) including a configuration identification (ID) of a target satellite.

5. The UE of claim 1, wherein:
the processor is further configured to start or restart a validity timer for the target satellite when initiating a UL synchronization operation; and
the transceiver is further configured to transmit a timing advance (TA) report medium access control control element (MAC CE) for the target satellite in at least one of:
a message 3 (Msg3) or a message A (MsgA) transmitted in the RA procedure,
a first UL transmission after the RA procedure, or
the first UL transmission without a RACH.

6. The UE of claim 1, wherein:
the processor is further configured to:
start a timer when the UE receives a network (NW) trigger indication, or
start the timer based on the start time; and
the processor is further configured to set a timer duration of the timer as the time duration.

7. The UE of claim 6, wherein the processor is further configured to:
stop the timer when the RA procedure is completed or the RACH-less synchronization operation is completed; and
when the timer expires, perform the RA procedure to a serving cell based on the satellite assistance information for the target satellite or perform a radio resource control (RRC) re-establishment procedure.

8. The UE of claim 1, wherein:
the transceiver is further configured to receive, from the BS, a timing advance (TA) report request that is identified as:
an intra-cell handover command via an RRC signaling; or
a request indication in downlink control information (DCI) included in a physical downlink control channel (PDCCH) associated with a RACH;
the processor is further configured to perform the RA and generate a TA report medium access control control element (MAC CE); and
the transceiver is further configured to transmit, to the BS, the TA report MAC CE included in at least one of a message 3 (Msg3), a message A (MsgA), and a message after the RA procedure.

9. The UE of claim 1, wherein:
the transceiver is further configured to receive, from the BS, a timing advance (TA) report request that is identified as:
a medium access control control element (MAC CE) including at least one of a periodic TA report request, an aperiodic TA report request, and a semi-persistent TA report request;
a request indication included in a radio resource control (RRC) message, the RRC message being a UE information request message, or
an RRC reconfiguration message including a TA measurement configuration and a TA report configuration, the TA report configuration indicating at least one of the periodic TA report request, the aperiodic TA report request, and the semi-persistent TA report request;
the processor is further configured to generate the TA report; and
the transceiver is further configured to transmit, to the BS, the TA report in an RRC message or in a MAC CE included in a UL message.

10. A method of a user equipment (UE), the method comprising:
  receiving, from a base station (BS), first information including satellite assistance information for a target satellite;
  receiving, from the BS, second information including timing information, wherein the timing information includes at least one of a start time and a time duration for a synchronization operation;
  determining whether a random access channel-less (RACH-less) synchronization operation is configured; and
  initiating, based on the satellite assistance information and the timing information, the synchronization operation by performing a random access (RA) procedure upon a determination that the RACH-less synchronization operation is not configured.

11. The method of claim 10, further comprising:
  receiving third information including RACH-less synchronization information that comprises a timing advance (TA) parameter; and
  initiating, based on the RACH-less synchronization information, the synchronization operation by performing the RACH-less synchronization operation using the TA parameter,
  wherein:
    the satellite assistance information includes at least one of ephemeris information, common TA parameters, an offset parameter, an epoch time, and a validity duration, and
    the first, second, and third information is received via system information or a UE-dedicated radio resource control (RRC) message.

12. The method of claim 10, further comprising:
  receiving an UL grant; and
  performing a first UL transmission after the RACH-less synchronization operation to the target satellite using the UL grant.

13. The method of claim 10, further comprising receiving a network (NW) trigger indication for the synchronization operation,
  wherein the NW trigger indication is identified as:
    an intra-cell handover command via an RRC signaling;
    an indication in downlink control information (DCI) included in a physical downlink control channel (PDCCH); or
    a medium access control control element (MAC CE) including a configuration identification (ID) of a target satellite.

14. The method of claim 10, further comprising:
  starting or restarting a validity timer for the target satellite when initiating a UL synchronization operation; and
  transmitting a timing advance (TA) report medium access control control element (MAC CE) for the target satellite in at least one of:
    a message 3 (Msg3) or a message A (MsgA) transmitted in the RA procedure,
    a first UL transmission after the RA procedure, or
    the first UL transmission without a RACH.

15. The method of claim 10, further comprising:
  starting a timer when the UE receives a NW trigger indication, or
  starting the timer based on the start time; and
  setting a timer duration of the timer as the time duration.

16. The method of claim 15, further comprising:
  stopping the timer when the RA procedure is completed or the RACH-less synchronization operation is completed; and
  when the timer expires, performing the RA procedure to a serving cell based on the satellite assistance information for the target satellite or perform a radio resource control (RRC) re-establishment procedure.

17. The method of claim 10, further comprising:
  receiving, from the BS, a timing advance (TA) report request that is identified as:
    an intra-cell handover command via an RRC signaling, or
    a request indication in downlink control information (DCI) included in a physical downlink control channel (PDCCH) associated with a RACH;
  performing the RA and generate a TA report medium access control control element (MAC CE); and
  transmitting, to the BS, the TA report MAC CE included in at least one of a message 3 (Msg3), a message A (MsgA), and a message after the RA procedure.

18. The method of claim 10, further comprising:
  receiving, from the BS, a timing advance (TA) report request that is identified as:
    a medium access control control element (MAC CE) including at least one of a periodic TA report request, an aperiodic TA report request, and a semi-persistent TA report request,
    a request indication included in a radio resource control (RRC) message, the RRC message being a UE information request message, or
    an RRC reconfiguration message including a TA measurement configuration and a TA report configuration, the TA report configuration indicating at least one of the periodic TA report request, the aperiodic TA report request, and the semi-persistent TA report request;
  generating the TA report; and
  transmitting, to the BS, the TA report in an RRC message or in a MAC CE included in a UL message.

19. A base station (BS) comprising:
  a processor; and
  a transceiver operably coupled to the processor, the transceiver configured to:
    transmit, to a user equipment (UE), first information including satellite assistance information for a target satellite, and
    transmit, to the UE, second information including timing information, wherein the timing information includes at least one of a start time and a time duration for a synchronization operation,
    transmit, to the UE, a third information indicating whether random access channel-less (RACH-less) synchronization operation is configured,
  wherein:
    when the indication indicates that the RACH-less synchronization operation is not configured, the synchronization operation is initiated based on the satellite assistance information and the timing information.

20. The BS of claim 19, wherein:
  the third information includes RACH-less synchronization information that comprises a timing advance (TA) parameter; and the transceiver is further configured to:
- transmit an UL grant;
- transmit a network (NW) trigger indication for the synchronization operation, the NW trigger indication being identified as:
  - an intra-cell handover command via an RRC signaling,
  - an indication in downlink control information (DCI) included in a physical downlink control channel (PDCCH), or
  - a medium access control control element (MAC CE) including a configuration identification (ID) of a target satellite;
- transmit, to the UE, a TA report request; and
- receive, from the UE, a TA report MAC CE for the target satellite.

* * * * *